United States Patent [19]
Wentworth

[11] 3,806,986
[45] Apr. 30, 1974

[54] CASTER WHEEL MOUNTINGS FOR INDUSTRIAL TRUCKS AND MOBILE PLATFORMS

[75] Inventor: William Charles Wentworth, DeeWhy, New South Wales, Australia

[73] Assignee: Acta Pty. Limited, Sydney, New South Wales, Australia

[22] Filed: Jan. 27, 1972

[21] Appl. No.: 221,360

[52] U.S. Cl. .................................. 16/18, 16/31
[51] Int. Cl. ............................................. B60b 33/00
[58] Field of Search ............... 16/20, 19, 32, 34, 18, 16/31 R; 280/79.3, 29

[56] References Cited
UNITED STATES PATENTS 3,246,908   4/1966   Marvin ................................ 16/18
2,830,825   4/1958   Webber et al. ...................... 16/18
2,688,149   9/1954   Popp .................................... 16/18

Primary Examiner—Bobby R. Gay
Assistant Examiner—Doris L. Troutman
Attorney, Agent, or Firm—Emory L. Groff; Emory L. Groff, Jr.

[57] ABSTRACT

Caster wheel mountings for industrial trucks and mobile platforms, each mounting comprising a base, an arm fulcrummed on the base for rotation in a horizontal plane, a saddle on the arm offset from the point of rotation, a caster (land) wheel or wheels mounted on the saddle and a load wheel or wheels mounted on the arm.

1 Claim, 2 Drawing Figures

CASTER WHEEL MOUNTINGS FOR INDUSTRIAL TRUCKS AND MOBILE PLATFORMS

This invention has been devised to provide caster wheel mountings for industrial trucks and mobile platforms to be used for conveying heavy loads as part of a transport system.

Basically the caster wheel mountings of this invention each comprise a base adapted for fixing to a load carrying member, a shaft projecting downwardly from the base with its axis vertical, an arm mounted on the shaft for rotating in a horizontal plane about the axis of the shaft, a saddle on and projecting downwardly from the arm offset from the shaft, a land wheel or wheels mounted on the saddle and a load wheel or wheels mounted on the arm in bearing contact with the base.

The shaft constitutes a pivot about which the land wheel(s) can move. The weight of the base including any load thereon is borne entirely by the load wheels.

Figure 1:
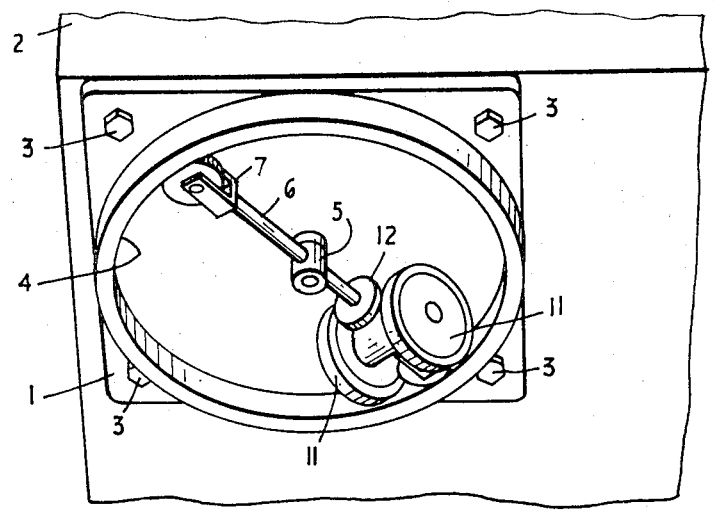
Figure 2:
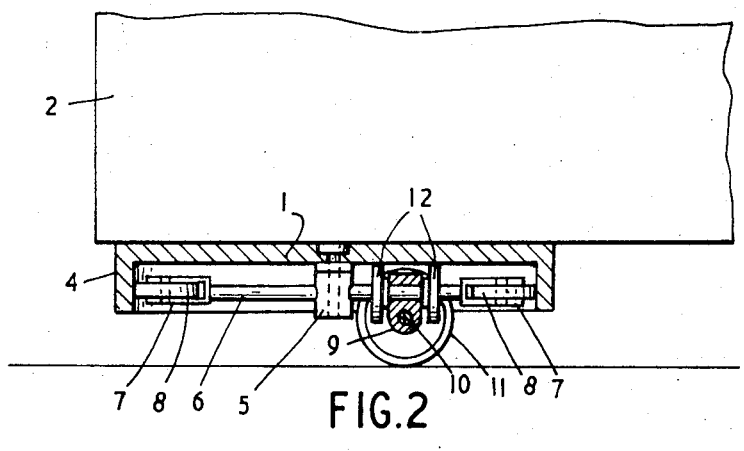

One embodiment of the invention is described with reference to the annexed drawings wherein, FIG. 1 is an inverted perspective view and FIG. 2 is a sectional elevation of a weight bearing caster and part of a platform.

As illustrated the base 1 is a plate fixed to a platform (load carrying member) 2 by bolts 3. The base 1 has a cylindrical ring 4 projecting from the bottom. The shaft 5 is a stub shaft. It is rotatably mounted on the base 1 and projects axially into the cylindrical ring 4.

The arm 6 projects diametrically through the shaft 5. It has a fork 7 on each end and a steadying wheel 8 in each fork engages the inner wall of the cylindrical ring 4.

A saddle 9 on the arm 6 offset from the shaft 5 projects downwardly and an axle 10 passing through the saddle has a land wheel 11 on each end. Load supporting wheels 12 are mounted on the arm 6, one on each side of the saddle 9 and in contact with the base 1.

I claim:

1. Caster wheel mountings for industrial trucks and mobile platforms, each said mounting comprising a base plate for attachment to a load carrying member, said base plate including a cylindrical ring projecting from the bottom thereof, a stub shaft projecting downwardly from the base into the cylindrical ring with its axis vertical, an arm projecting diametrically horizontally through the shaft for rotating in a horizontal plane, a steadying wheel on each end of said arm and engaging the inner wall of the cylindrical ring, a saddle on and projecting downwardly from the arm, said saddle being offset from the shaft, land wheels mounted on the saddle and load supporting wheels mounted on the arm in bearing contact with the base.

* * * * *